(12) United States Patent
Liang et al.

(10) Patent No.: US 10,053,544 B2
(45) Date of Patent: Aug. 21, 2018

(54) CARBON NANOTUBE/POLYETHERIMIDE/ THERMOSETTING RESIN DIELECTRIC COMPOSITE AND PREPARATION METHOD THEREFOR

(71) Applicant: SOOCHOW UNIVERSITY, Suzhou (CN)

(72) Inventors: Guozheng Liang, Suzhou (CN); Yicheng Jiao, Suzhou (CN); Aijuan Gu, Suzhou (CN); Li Yuan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 15/534,500

(22) PCT Filed: May 28, 2015

(86) PCT No.: PCT/CN2015/080146
§ 371 (c)(1),
(2) Date: Jun. 9, 2017

(87) PCT Pub. No.: WO2016/107058
PCT Pub. Date: Jul. 7, 2016

(65) Prior Publication Data
US 2017/0335069 A1     Nov. 23, 2017

(30) Foreign Application Priority Data
Dec. 29, 2014 (CN) .......................... 2014 1 0832252

(51) Int. Cl.
| | |
|---|---|
| *C08J 3/00* | (2006.01) |
| *C08K 7/24* | (2006.01) |
| *C08L 63/00* | (2006.01) |
| *C08L 79/04* | (2006.01) |
| *C08L 79/08* | (2006.01) |
| *B29B 7/00* | (2006.01) |
| *B29B 7/18* | (2006.01) |
| *B29B 7/82* | (2006.01) |
| *C08J 3/20* | (2006.01) |
| *C08L 35/00* | (2006.01) |
| *H01B 3/30* | (2006.01) |
| *H01B 3/40* | (2006.01) |
| *H01B 3/44* | (2006.01) |
| *C08J 3/205* | (2006.01) |
| *B29K 63/00* | (2006.01) |
| *B29K 79/00* | (2006.01) |
| *B29K 307/04* | (2006.01) |

(52) U.S. Cl.
CPC ............... *C08J 3/005* (2013.01); *B29B 7/005* (2013.01); *B29B 7/183* (2013.01); *B29B 7/82* (2013.01); *C08J 3/201* (2013.01); *C08J 3/203* (2013.01); *C08J 3/2056* (2013.01); *C08K 7/24* (2013.01); *C08L 35/00* (2013.01); *C08L 63/00* (2013.01); *C08L 79/04* (2013.01); *C08L 79/08* (2013.01); *H01B 3/303* (2013.01); *H01B 3/306* (2013.01); *H01B 3/40* (2013.01); *H01B 3/448* (2013.01); *B29K 2063/00* (2013.01); *B29K 2079/085* (2013.01); *B29K 2307/04* (2013.01); *B29K 2995/0006* (2013.01); *C08J 2300/24* (2013.01); *C08J 2335/00* (2013.01); *C08J 2363/02* (2013.01); *C08J 2379/04* (2013.01); *C08J 2479/04* (2013.01); *C08J 2479/08* (2013.01); *C08L 2205/02* (2013.01); *C08L 2205/03* (2013.01)

(58) Field of Classification Search
CPC ... C08J 3/005; C08J 3/201; C08J 3/203; C08J 3/2056; C08K 7/24
See application file for complete search history.

(56) References Cited

U.S. PATENT DOCUMENTS

| 2009/0264317 A1 | 10/2009 | Ofir et al. |
| 2011/0163275 A1 | 7/2011 | Simmons et al. |

FOREIGN PATENT DOCUMENTS

| CN | 104513485 A | 4/2015 |

*Primary Examiner* — Edward J Cain
(74) *Attorney, Agent, or Firm* — SZDC Law P.C.

(57) ABSTRACT

The invention discloses a carbon nanotube/polyetherimide/ thermosetting resin dielectric composite and a preparation method therefor. 100 parts by weight of polyetherimide and 1-7 parts by weight of carbon nanotube are mixed uniformly in an Haake torque melt cavity to obtain a carbon nanotubes/ polyetherimide composite; 20 parts of the carbon nanotube/ polyetherimide composite are dissolved in 100-150 parts of dichloromethane, then the mixed solution is added in 100 parts of molten thermocurable thermosetting resin, mixing, and heat preserving, stirring are performed until a mixture is formed in a uniform state, and curing and post-treating are performed to obtain a carbon nanotube/thermosetting resin dielectric composite, wherein the substrate thereof has a typical reverse phase structure, while the carbon nanotubes are dispersed in a polyetherimide phase. The composite has a relatively low percolation threshold, a high dielectric constant and a low dielectric loss. The preparation method of the present invention has a simple process and is suitable for large-scale production.

6 Claims, 3 Drawing Sheets

CARBON NANOTUBE/POLYETHERIMIDE/THERMOSETTING RESIN DIELECTRIC COMPOSITE AND PREPARATION METHOD THEREFOR

This application is PCT national stage application of PCT/CN2015/080146, filed on May 28, 2015, which claims priority to Chinese Patent Application No.: 201410832252.0, filed on Dec. 29, 2014, all of which are incorporated by reference for all purposes as if fully set forth herein.

FIELD OF THE INVENTION

This invention relates to a dielectric composite and the preparation method therefor. In particular related to a carbon nanotube/polyetherimide/thermosetting resin dielectric composite material having a high dielectric constant, composed of a resin substrate having a reverse-phase structure, and the preparation method therefor.

BACKGROUND OF THE INVENTION

Polymer composites with high dielectric constant are important functional materials with important application value in many fields such as the insulation, electromechanical and biological engineering, etc. Introducing electric conductive into polymers is one main route for preparing polymer composites with high dielectric constant. Owing to outstanding electrical properties, large length to diameter ratio and good mechanical properties, carbon nanotubes have attracted much attention. To date, a variety of carbon nanotube/polymer composites have been prepared. As a conductor/polymer composite, the carbon nanotube/polymer composite undergoes an insulator-conductor transition when the content of carbon nanotubes approaches the percolation threshold, resulting in a high dielectric constant, but also tends to have high dielectric loss. On the other hand, low percolation thresholds are undoutedly attractive in order to maintain good processability of the polymer and to reduce processing costs.

At present, forming a coating on the surface of the electric conductor is an effective method to reduce dielectric loss. The coating can prevent the mutual contact of conductors, thereby depressing the leakage current in composites. However, the corresponding composites based on the coated fillers usually enlarge percolation thresholds ($f_c$ values). To overcome this problem, people try to form a double percolation structure, to achieve the goal of reducing the percolation threshold. In detail, nanofillers are selectively distributed in one phase of the immiscible polymer blend, or selective distribution of nanofillers at the interface to form the percolated network structure, and thus reducing the content of nanofillers. For example, before this invention, Dang's group introduced multi-walled carbon nanotubes (MWCNTs) into polystyrene (PS)/poly(vinylidene fluoride) (PVDF) blend that has double continuous phase morphology, and found that with the same content of MWCNTs, the dispersion of MWCNTs in different phase played a significant role on dielectric properties of the composites. However, the maximum dielectric constant that MWCNT/PS/PVDF composites exhibited was 485 at 100 Hz, and at this condition, the loading of MWCNTs was as high as 3.9 vol % (please see: Xiaodong Zhao, Jun Zhao, Jianping Cao, Dongrui Wang, Guohua Hu, Fenghua Chen, Zhimin Dang. Effect of the selective localization of carbon nanotubes in polystyrene/poly(vinylidene fluoride) blends on their dielectric, thermal, and mechanical properties. Materials and Design. 2014, 56: 807-815). This group also made effort on dispersing MWCNTs at the interface between PS and PVDF, and found that when f=0.4-0.6 wt %, the composite has the maximum dielectric constant at 100 Hz, which is 398; while the dielectric loss is also very high, which is 0.8-200 at 100 Hz. These interesting researches have demonstrated that using a polymer blend with double continuous morphology is beneficial to prepare Hik-PNCs with lower $f_c$, but this kind of polymeric matrix seems not effective for simultaneously obtaining high dielectric constant and low dielectric loss. What's more, complicate structural design seems not effective for obviously improve the integrated dielectric performances, and introduction of more polymers makes the processing become difficult to be controlled.

Based on the overall background described above, it is still a great challenge to explore a new and effective method of preparing electric conductor/polymer composites with high dielectric constant, low dielectric loss and low $f_c$.

SUMMARY OF THE INVENTION

To overcome the deficiencies of existing dielectric thermosetting resin composites, the invention provides a carbon nanotube/polyetherimide/thermosetting resin dielectric composite with high dielectric constant, low dielectric loss and low percolation threshold, and their preparation method. The preparation method is easy to be controlled and suitable for a large-scale production.

For this purpose, the technical solution of the invention is as follows:

A preparation method of a carbon nanotube/polyetherimide/thermosetting resin dielectric composite, which comprising following steps:

1. mixing 100 parts by weight of polyetherimide and 1-7 parts by weight of carbon nanotube uniformly and adding into an Haake torque melt cavity, mixing in a Banbury mixer for 10-30 min under the temperature of 300-340° C. with the rotating speed of 50-150 r/min, to obtain a carbon nanotubes/polyetherimide composite;

2. in a mass ratio, dissolving 20 parts of carbon nanotube/polyetherimide composite in 120-150 parts of methylene chloride, and mixing the resulting solution with 100 parts of molten thermosetting resin, heat preserving and stirring for 30-50 min, after curing to obtain a carbon nanotube/polyetherimide/thermosetting resin dielectric composite.

In the above technology, said carbon nanotube is one of single-walled carbon nanotube without surface treatment, multi-walled carbon nanotube without surface treatment, or their combination.

Said thermosetting resin is a self-curing thermosetting resin, such as bismaleimide, cyanate eater, or their combination; or a resin system composing of a resin that cannot be thermally cured by itself and curing agents, such as epoxy resin.

The present invention also includes a carbon nanotube/polyetherimide/thermosetting resin dielectric composite obtained by the above-mentioned preparation method.

Compared with the prior arts, the invention has following beneficial effects:

1. In this invention, carbon nanotubes without any surface treatment are used as conductive fillers, so the excellent dielectric properties of carbon nanotubes can be maintained with the maximum possibility. In addition, the controllable distribution of carbon nanotubes in poly(ether imide) phase is successfully achieved through the melting blending with the aid of strong melting shear in the Haake chamber.

Specifically, poly(ether imide) becomes an electron acceptor after melting shear in the Haake chamber, and thus can interact with delocalized π electron clouds of carbon nanotubes, and consequently, forming a donor-acceptor complex, which is beneficial to get good dispersion stability for carbon nanotubes. Therefore, this preparation is facile and easy to be used in a large-scale production. Meanwhile, the existence of a thin poly(ether imide) layer that is coated on the surfaces of carbon nanotubes hinders the direct connection of carbon nanotubes, and then reduces leakage loss, leading to low dielectric loss.

2. In the invention, the poly(ether imide)/thermosetting resin blend shows the classic reverse-phase structure, in which bismaleimide resin is the dispersed phase, which is dispersed in the poly(ether imide) continuous phase; the dispersed phase has large domain size due to the large concentration of bismaleimide resin. Note that carbon nanotubes are homogeneously distributed in the poly(ether imide) phase of composite, so an effective conductive network can be formed with a fewer loading of carbon nanotubes, and thus providing the composites with high dielectric constant.

3. In the reverse-phase structure, the polymer with higher concentration (bismaleimide resin) forms many spherical domains and dispersed in the poly(ether imide) phase, in detail, bismaleimide phase domains were surrounded by carbon nanotube/poly(ether imide) complex that looks like many "ribbons" owing to the stretching and winding roles during the formation of spherical bismaleimide domains in continuous poly(ether imide) phase. So carbon nanotubes in the parallel normal plane of the bismaleimide domains form many new micro-capacitors, endowing the composites with greatly increased dielectric constant.

4. The preparation method in the invention combine the advantages of Haake melt-shearing technique and melt-mixing technique, and thus successfully making carbon nanotubes preferentially distributed in the pre-set phase. What's more, the continuous and step-curing process was used, which provides sufficient time and suitable temperature for the formation of the reverse-phase structure, leading to the better stability of structure. The facile preparation method is easy and to be controlled and suitable to employed in large-scale production.

DETAILED DESCRIPTION OF THE INVENTION

The technical solution of the present invention will be further described hereinafter with reference to the accompanying figures and examples.

EXAMPLE 1

1. Preparation of Carbon Nanotube/Poly(Ether Imide) Complex

The melting temperature of Haake torque chamber was set at 330° C. and the shearing rate was 60 r/min. 3.0 g multi-walled carbon nanotubes and 60 g poly(ether imide) were homogenously blended to form a blend, which was then put into the Haake torque chamber, and mixed for 15 min. After that, cooled to the room temperature, carbon nanotube/poly(ether imide) complex was achieved.

2. Preparation of Dielectric Carbon Nanotube/Poly(Ether Imide)/Bismaleimide Composite 10.5 g carbon nanotube/poly(ether imide) complex was dissolved in 100 mL $CH_2Cl_2$ to obtain a homogenous solution A, into which 37 g 2,2'-diallylbisphenol A was added. The resultant solution was heated to 150° C., into which 50 g 4, 4'-bismaleimidodiphenylmethane was slowly added with vigorous stirring, and the whole mixture was maintained at 150° C. for 40 min to get a prepolymer. The prepolymer was put into a vacuum for de-gassing at 145° C. for 30 min, and then put into a preheated mold and an oven for curing and postcuring using the procedure of 165° C./2 h+185° C./2 h+220° C./2 h+240° C./4 h. followed by cooling to room temperature naturally in the oven. A dielectric carbon nanotube/poly(ether imide)/bismaleimide composite was obtained, of which the total mass fraction of carbon nanotubes in the composite is 0.45 wt %.

The SEM image, conductivities, dielectric constants, dielectric losses and capacitance at different frequencies as well as the conductivity at 1 Hz of the composite were shown in FIGS. 1, 2, 3, 4, 5, and 6, respectively.

Comparison 1

37 g 2, 2'-diallylbisphenol A and 0.45 g multi-walled carbon nanotubes were blended at 70° C. for 1 h under ultrasound condition with stirring to form a mixture A.

10 g poly(ether imide) was dissolved in 100 mL $CH_2Cl_2$ to obtain a homogenous solution B.

The solution B was added into A, and then the resultant solution was heated to 150° C., into which 50 g 4, 4'-bismaleimidodiphenylmethane was slowly added with vigorous stirring, and the whole mixture was maintained at 150° C. for 40 min to get a prepolymer. The prepolymer was put into a vacuum for de-gassing at 145° C. for 30 min, and then put into a preheated mold and an oven for curing and postcuring using the procedure of 165° C./2 h+185° C./2 h+220° C./2 h+240° C./4 h. followed by cooling to room temperature naturally in the oven to obtain a dielectric carbon nanotube/poly(ether imide)/bismaleimide composite, of which the total mass fraction of carbon nanotubes in the composite is 0.45 wt %.

The SEM image, conductivities, dielectric constants, dielectric losses and capacitance at different frequencies of the composite were shown in FIGS. 1, 2, 3, 4, and 5, respectively.

Figure 1:
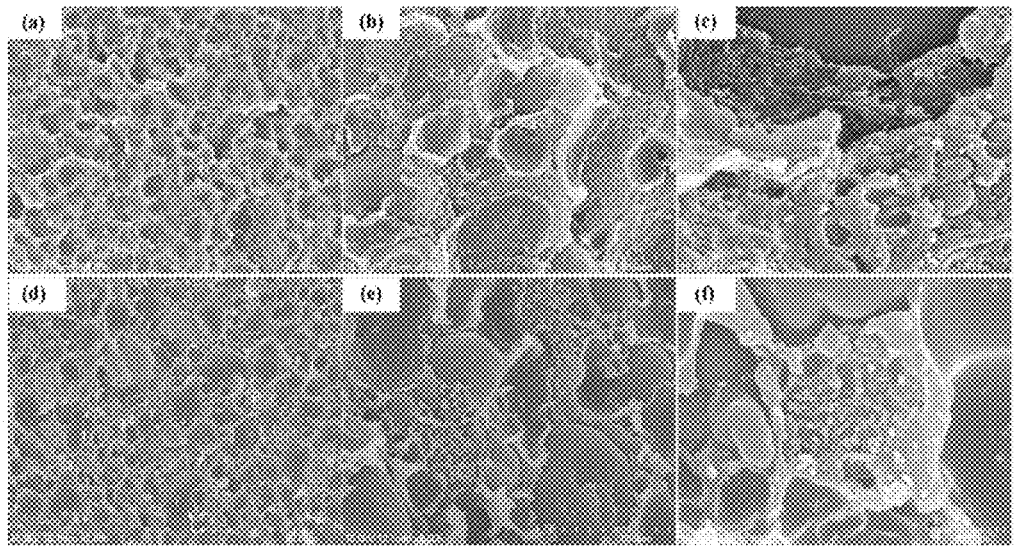
FIG. 1 illustrates SEM photos of fracture surfaces of dielectric carbon nanotube/poly(ether imide)/bismaleimide composite prepared in Example 1 and carbon nanotube/poly(ether imide)/bismaleimide composite prepared in Comparison 1.

FIG. 1 shows SEM photos of fracture surfaces of dielectric carbon nanotube/poly(ether imide)/bismaleimide composite prepared in Example 1 and that of dielectric carbon nanotube/poly(ether imide)/bismaleimide composite prepared in Comparison 1. It can be clearly seen from the close-up view (FIG. 1a) and zoom-in view (FIGS. 1b, 1c) of the composite prepared in Example 1 that the composite shows typical reverse-phase structure, in which the bismaleimide resin phase is dispersed in the poly(ether imide) continuous phase, and the dispersed phase has large domain size due to the large concentration of bismaleimide resin. Specially, carbon nanotubes are homogeneously distributed in the poly(ether imide) phase of composite (FIG. 1c), and poly(ether imide) resin looks like long ribbon, which surrounds the bismaleimide phase to form a continuous phase; the phase interface can be clearly seen in FIGS. 1b and 1c.

Note that there is big difference in the interfacial energy among poly(ether imide), bismaleimide and multi-walled carbon nanotubes, and carbon nanotubes are prefer to be distributed into bismaleimide phase; what's more, bismaleimide resin has lower viscosity than poly(ether imide). So it is easy to disperse carbon nanotubes are in bismaleimide phase using the processing technique described in Comparison 1. It can be clearly seen from the close-up view (FIG. 1d) and zoom-in view (FIGS. 1e, 1f) of the composite prepared in Comparison 1 that the composite also shows typical reverse-phase structure, and carbon nanotubes are homogeneously distributed in the bismaleimide phase of the composite.

Figure 2:
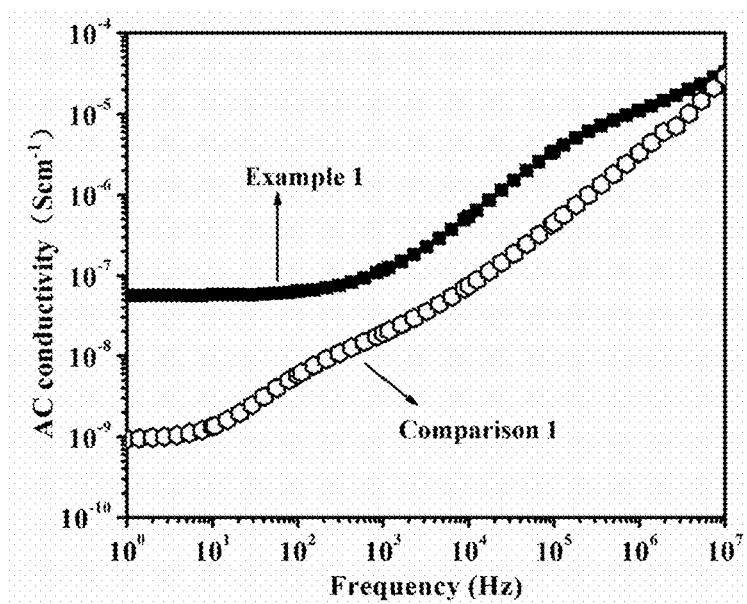
FIG. 2 shows overlay plots of the dependence of AC conductivity on frequency for different composites prepared in Example 1 and Comparison 1.

FIG. 2 gives overlay plots representing the dependence of AC conductivity on frequency for the composites prepared in Example 1 and Comparison 1, respectively. It can be observed that the composite prepared in Example 1 has much higher conductivity than the composite prepared in Comparison 1, suggesting that with the same components, it is easier to form the conductive network in the composite by the processing of Example 1. And as a result, the preparation method of Example 1 has the advantage in reducing the content of the conductors.

Figure 3:
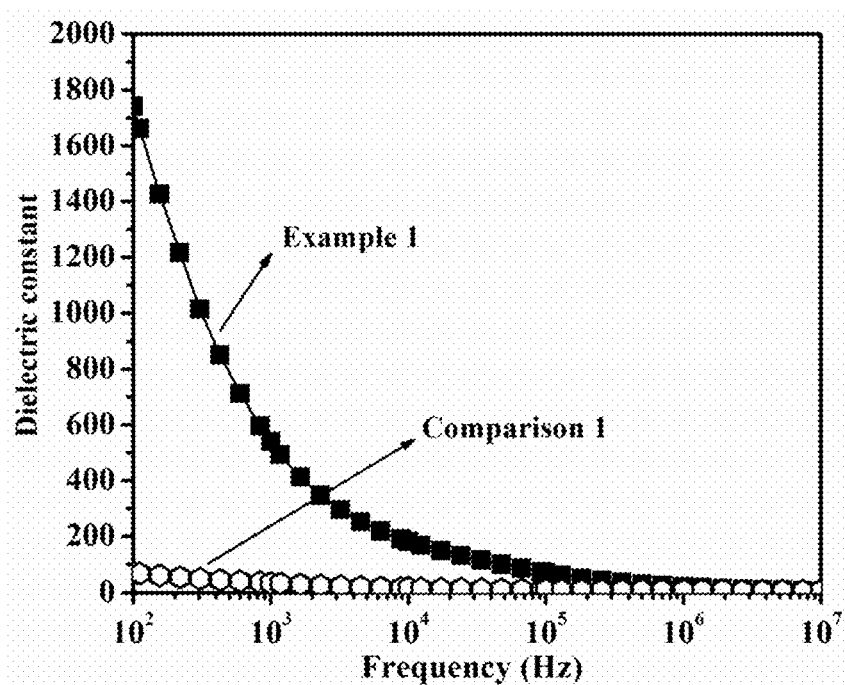
FIG. 3 gives overlay plots of the dependence of dielectric constant on frequency for different composites prepared in Example 1 and Comparison 1.

FIG. 3 shows the overlay plots representing the dependence of dielectric constant on frequency for the composites prepared in Example 1 and Comparison 1, respectively. With the same loading of carbon nanotubes, the composite prepared in Example 1 has larger dielectric constant than the composite prepared in Comparison 1. For example, the dielectric constant at 100 Hz of the composite prepared in Comparison 1 is just 71, while that of the composite prepared in Example 1 is as large as 1742, demonstrating that the carbon nanotube/poly(ether imide)/bismaleimide composite prepared in Example 1 has better dielectric property.

Figure 4:
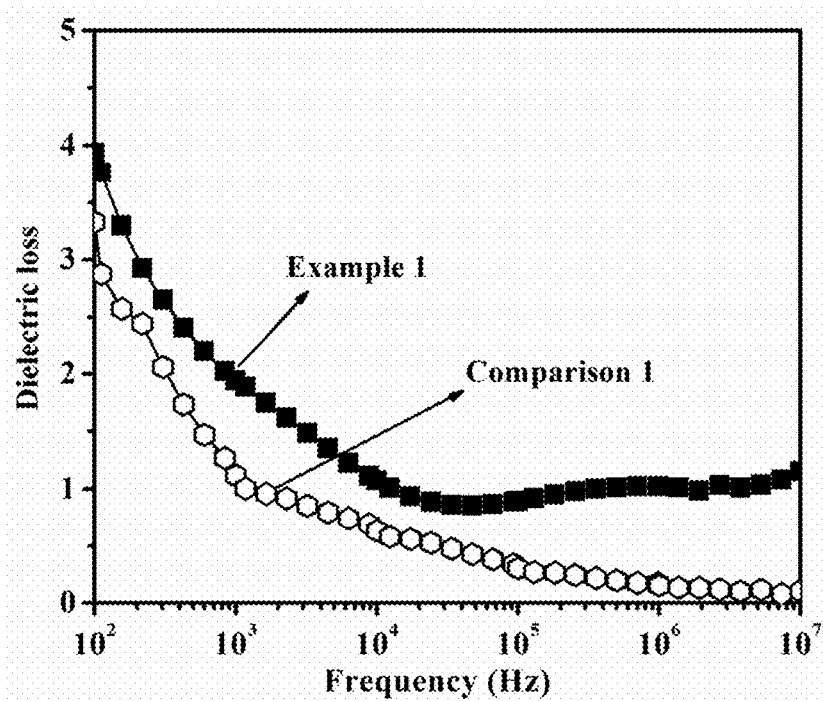
FIG. 4 depicts overlay plots of the dependence of dielectric loss on frequency for different composites prepared in Example 1 and Comparison 1.
Figure 5:
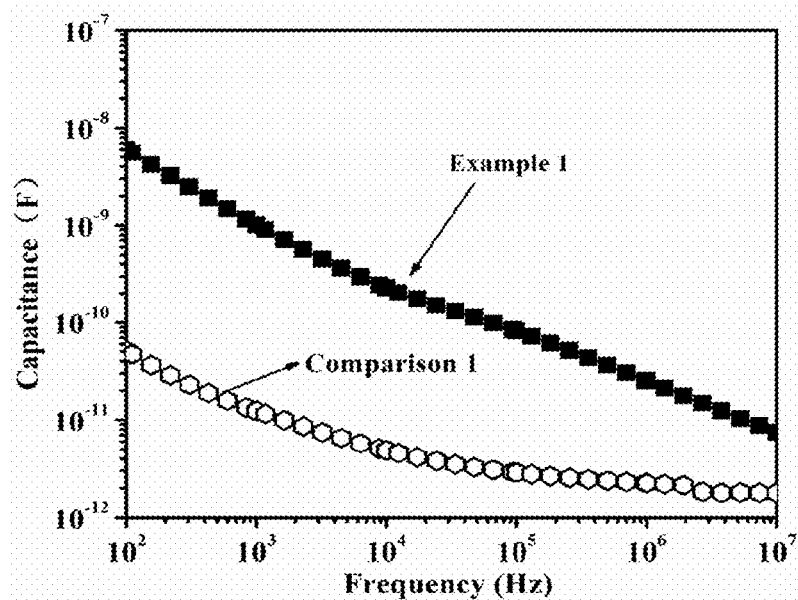
FIG. 5 shows overlay plots of the dependence of capacitance on frequency for different composites prepared in Example 1 and Comparison 1.

FIG. 4 depicts overlay plots representing the dependence of dielectric loss on frequency for the composites prepared in Example 1 and Comparison 1, respectively. It can be seen that the two composites have similar dielectric loss, meaning that the preparation method described in Example 1 substantially keeps low dielectric loss and significantly improves the dielectric constant FIG. 5 displays the overlay plots representing dependence of capacitance on frequency for different composites prepared in Example 1 and Comparison 1, respectively. It can be obviously seen that the capacitance of the composite prepared in Example 1 is two orders of magnitude higher than that of the composite prepared in Comparison 1. This result is attributed to the special structure of the composite prepared in Example 1; specifically, the carbon nanotube/poly(etherimide) complex surrounds spherical bismaleimide domains, wherein carbon nanotubes were arranged normally to the radius of the bismaleimide sphere zone, forming new and more micro-capacitors.

EXAMPLE 2

1. Preparation of Carbon Nanotube/Poly(Ether Imide) Complex

The melting temperature of Haake torque chamber was set at 330° C. and the shearing rate was 60 r/min. 0.6 g multi-walled carbon nanotubes and 60 g poly(ether imide) were homogenously blended to form a blend, which was then put into the Haake torque chamber and mixed for 15 min. After that, cooled to the room temperature, the carbon nanotube/poly(ether imide) complex was achieved.

2. Preparation of Dielectric Carbon Nanotube/Poly(Ether Imide)/Bismaleimide Composite 10.1 g carbon nanotube/poly(ether imide) complex was dissolved in 75 mL $CH_2Cl_2$ to obtain a homogenous solution A, into which 30 g 2,2'-diallylbisphenol A was added. The resultant solution was heated to 150° C., into which 50 g 4, 4'-bismaleimidodiphenylmethane was slowly added with vigorous stirring, and the whole mixture was maintained at 150° C. for 40 min to get a prepolymer. The prepolymer was put into a vacuum for de-gassing at 145° C. for 30 min, and then put into a preheated mold and an oven for curing and postcuring using the procedure of 165° C./2 h+185° C./2 h+220° C./2 h+240° C./4 h. followed by cooling to room temperature naturally in the oven. A dielectric carbon nanotube/poly(ether imide)/bismaleimide composite was obtained, of which the total mass fraction of carbon nanotubes in the composite is 0.1 wt %. The conductivity at 1 Hz of the composite prepared was shown in FIG. 6.

EXAMPLE 3

1. Preparation of Carbon Nanotube/Poly(Ether Imide) Complex

The melting temperature of Haake torque chamber was set at 340° C. and the shearing rate was 100 r/min. 4.2 g multi-walled carbon nanotubes and 60 g poly(ether imide) were homogenously blended to form a blend, which was then put into the Haake torque chamber, and mixed for 10 min. After that, cooled to the room temperature, carbon nanotube/poly(ether imide) complex was achieved.

2. Preparation of Dielectric Carbon Nanotube/Poly(Ether Imide)/Bismaleimide Composite 10.0 g carbon nanotube/poly(ether imide) complexes was dissolved in 100 mL $CH_2Cl_2$ to obtain a homogenous solution A, into which 45 g 2,2'-diallylbisphenol A was added. The resultant solution was heated to 150° C., into which 50 g 4, 4'-bismaleimidodiphenylmethane was slowly added with vigorous stirring, and the whole mixture was maintained at 150° C. for 40 min to get a prepolymer. The prepolymer was put into a vacuum for de-gassing at 145° C. for 30 min, and then put into a preheated mold and an oven for curing and postcuring using the procedure of 165° C./2 h+185° C./2 h+220° C./2 h+240° C./4 h. followed by cooling to room temperature naturally in the oven. A dielectric carbon nanotube/poly(ether imide)/bismaleimide composite was obtained, of which the total mass fraction of carbon nanotubes in the composite is 0.67 wt %. The conductivity at 1 Hz of the composite prepared was shown in FIG. 6.

EXAMPLE 4

1. Preparation of Carbon Nanotube/Poly(Ether Imide) Complex

The melting temperature of Haake torque chamber was set at 300° C. and the shearing rate was 150 r/min. 2.4 g multi-walled carbon nanotubes and 60 g poly(ether imide) were homogenously blended to form a blend, which was then put into the Haake torque chamber, and mixed for 25 min. After that, cooled to the room temperature, carbon nanotube/poly(ether imide) complex was achieved.

2. Preparation of Dielectric Carbon Nanotube/Poly(Ether Imide)/Bismaleimide Composite 10.0 g carbon nanotube/poly(ether imide) complexes was dissolved in 90 mL $CH_2Cl_2$ to obtain a homogenous solution A, into which 38 g 2,2'-diallylbisphenol A was added. The resultant solution was heated to 150° C., into which 50 g 4,4'-bismaleimidodiphenylmethane was slowly added with vigorous stirring, and the whole mixture was maintained at 150° C. for 40 min to get a prepolymer. The prepolymer was put into a vacuum for de-gassing at 145° C. for 30 min, and then put into a preheated mold and an oven for curing and postcuring using the procedure of 165° C./2 h+185° C./2 h+220° C./2 h+240° C./4 h. followed by cooling to room temperature naturally in the oven. A dielectric carbon nanotube/poly(ether imide)/bismaleimide composite was obtained, of which the total mass fraction of carbon nanotubes in the composite is 0.36 wt %. The conductivity at 1 Hz of the composite prepared was shown in FIG. 6.

EXAMPLE 5

1. Preparation of Carbon Nanotube/Poly(Ether Imide) Complex

The melting temperature of Haake torque chamber was set at 340° C. and the shearing rate was 50 r/min. 1.8 g multi-walled carbon nanotubes and 60 g poly(ether imide) were homogenously blended to form a blend, which was then put into the Haake torque chamber, and mixed for 10 min. After that, cooled to the room temperature, the carbon nanotube/poly(ether imide) complex was achieved.

2. Preparation of Dielectric Carbon Nanotube/Poly(Ether Imide)/Bismaleimide Composite 10.0 g carbon nanotube/poly(ether imide) complexes was dissolved in 85 mL $CH_2Cl_2$ to obtain a homogenous solution A, into which 35 g 2,2'-diallylbisphenol A was added. The resultant solution was heated to 150° C., into which 50 g 4,4'-bismaleimidodiphenylmethane was slowly added with vigorous stirring, and the whole mixture was maintained at 150° C. for 40 min to get a prepolymer. The prepolymer was put into a vacuum for de-gassing at 145° C. for 30 min, and then put into a preheated mold and an oven for curing and postcuring using the procedure of 165° C./2 h+185° C./2 h+220° C./2 h+240° C./4 h. followed by cooling to room temperature naturally in the oven. A dielectric carbon nanotube/poly(ether imide)/bismaleimide composite was obtained, of which the total mass fraction of carbon nanotubes in the composite is 0.25 wt %. The conductivity at 1 Hz of the composite prepared was shown in FIG. 6.

EXAMPLE 6

1. Preparation of Carbon Nanotube/Poly(Ether Imide) Complex

The melting temperature of Haake torque chamber was set at 330° C. and the shearing rate was 60 r/min. 3.6 g multi-walled carbon nanotubes and 60 g poly(ether imide) were homogenously blended to form a blend, which was then put into the Haake torque chamber, and mixed for 10 min. After that, cooled to the room temperature, the carbon nanotube/poly(ether imide) complex was achieved.

2. Preparation of Dielectric Carbon Nanotube/Poly(Ether Imide)/Bismaleimide Composite 10.0 g carbon nanotube/poly(ether imide) complexes was dissolved in 80 mL $CH_2Cl_2$ to obtain a homogenous solution A, into which 37 g 2,2'-diallylbisphenol S was added. The resultant solution was heated to 150° C., into which 50 g 4,4'-bismaleimidodiphenylmethane was slowly added with vigorous stirring, and the whole mixture was maintained at 150° C. for 40 min to get a prepolymer. The prepolymer was put into a vacuum for de-gassing at 145° C. for 30 min, and then put into a preheated mold and an oven for curing and postcuring using the procedure of 165° C./2 h+185° C./2 h+220° C./2 h+240° C./4 h. followed by cooling to room temperature naturally in the oven. A dielectric carbon nanotube/poly(ether imide)/bismaleimide composite was obtained, of which the total mass fraction of carbon nanotubes in the composite is 0.58 wt %. The conductivity at 1 Hz of the composite prepared was shown in FIG. 6.

EXAMPLE 7

1. Preparation of Carbon Nanotube/Poly(Ether Imide) Complex

The melting temperature of Haake torque chamber was set at 300° C. and the shearing rate was 90 r/min. 3.3 g multi-walled carbon nanotubes and 60 g poly(ether imide) were homogenously blended to form a blend, which was then put into the Haake torque chamber, and mixed for 15 min. After that, cooled to the room temperature, the carbon nanotube/poly(ether imide) complex was achieved.

2. Preparation of Dielectric Carbon Nanotube/Poly(Ether Imide)/Bismaleimide Composite 10.0 g carbon nanotube/poly(ether imide) complexes was dissolved in 80 mL $CH_2Cl_2$ to obtain a homogenous solution A, into which 38 g 2,2'-diallylbisphenol A was added. The resultant solution was heated to 150° C., into which 50 g 4,4'-bismaleimidodiphenylmethane was slowly added with vigorous stirring, and the whole mixture was maintained at 150° C. for 40 min to get a prepolymer. The prepolymer was put into a vacuum for de-gassing at 145° C. for 30 min, and then put into a preheated mold and an oven for curing and postcuring using the procedure of 165° C./2 h+185° C./2 h+220° C./2 h+240° C./4 h. followed by cooling to room temperature naturally in the oven. A dielectric carbon nanotube/poly(ether imide)/bismaleimide composite was obtained, of which the total mass fraction of carbon nanotubes in the composite is 0.50 wt %. The conductivity at 1 Hz of the composite prepared was shown in FIG. 6.

Figure 6:
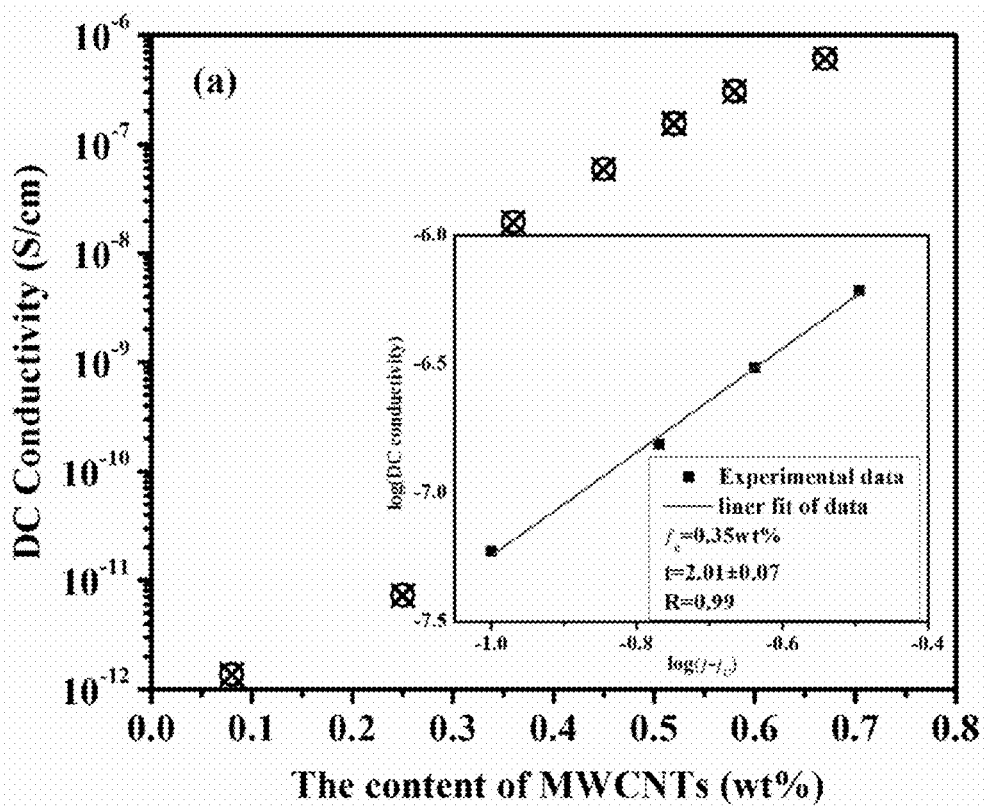
FIG. 6 displays overlay plots of the dependence of AC conductivity at 1 Hz on the concentration of carbon nanotubes in different composites prepared in Examples 1-7.

FIG. 6 displays the dependence of AC conductivity at 1 Hz on the concentration of carbon nanotubes in different composites prepared in Example 1, Example 2, Example 3, Example 4, Example 5, Example 6 and Example 7, respectively, and the insert shows the log ($\sigma$)–log (f–$f_c$) plot. By using a least-square fits for repeated experiments based on AC conductivities of the composites at 1 Hz with different contents of multi-walled carbon nanotubes, the $f_c$ value of the composites prepared in these Examples was calculated to be 0.35 wt %, so the composites prepared in this invention have low percolation threshold.

EXAMPLE 8

1. Preparation of Carbon Nanotube/Poly(Ether Imide) Complex

The melting temperature of Haake torque chamber was set at 300° C. and the shearing rate was 80 r/min. 3.0 g multi-walled carbon nanotubes and 60 g poly(ether imide)

were homogenously blended to form a blend, which was then put into the Haake torque chamber, and mixed for 15 min. After that, cooled to the room temperature, the carbon nanotube/poly(ether imide) complex was achieved.

2. Preparation of Dielectric Carbon Nanotube/Poly(Ether Imide)/Cyanate Eater Composite 10.0 g carbon nanotube/poly(ether imide) complexes was dissolved in 80 mL $CH_2Cl_2$ to obtain a homogenous solution A, into which 50 g 2,2'-bis(4-cyanatophenyl) propane (bisphenol A type cyanate eater) was slowly added with vigorous stirring, and the whole mixture was maintained at 150° C. for 40 min to get a prepolymer. The prepolymer was put into a vacuum for de-gassing at 145° C. for 30 min, and then put into a preheated mold and an oven for curing and postcuring using the procedure of 150° C./2 h+180° C./2 h+200° C./2 h+220° C./2 h+240° C./4 h. followed by cooling to room temperature naturally in the oven. A dielectric carbon nanotube/poly(ether imide)/cyanate eater composite was obtained.

EXAMPLE 9

1. Preparation of Carbon Nanotube/Poly(Ether Imide) Complex

The melting temperature of Haake torque chamber was set at 340° C. and the shearing rate was 60 r/min. 0.6 g multi-walled carbon nanotubes and 60 g poly(ether imide) were homogenously blended to form a blend, which was then put into the Haake torque chamber, and mixed for 10 min. After that, cooled to the room temperature, the carbon nanotube/poly(ether imide) complex was achieved.

2. Preparation of Dielectric Carbon Nanotube/Poly(Ether Imide)/Cyanate Eater Composite 10.0 g carbon nanotube/poly(ether imide) complexes was dissolved in 60 mL $CH_2Cl_2$ to obtain a homogenous solution A, into which 50 g 2,2'-bis(4-cyanatophenyl) propane (bisphenol A type cyanate eater) was slowly added with vigorous stirring, and the whole mixture was maintained at 150° C. for 40 min to get a prepolymer. The prepolymer was put into a vacuum for de-gassing at 145° C. for 30 min, and then put into a preheated mold and an oven for curing and postcuring using the procedure of 150° C./2 h+180° C./2 h+200° C./2 h+220° C./2 h+240° C./4 h. followed by cooling to room temperature naturally in the oven. A dielectric carbon nanotube/poly(ether imide)/cyanate eater composite was obtained.

EXAMPLE 10

1. Preparation of Carbon Nanotube/Poly(Ether Imide) Complex

The melting temperature of Haake torque chamber was set at 330° C. and the shearing rate was 60 r/min. 4.2 g multi-walled carbon nanotubes and 60 g poly(ether imide) were homogenously blended to form a blend, which was then put into the Haake torque chamber, and mixed for 20 min. After that, cooled to the room temperature, the carbon nanotube/poly(ether imide) complex was achieved.

2. Preparation of Dielectric Carbon Nanotube/Poly(Ether Imide)/Cyanate Eater Composite 8.0 g carbon nanotube/poly(ether imide) complexes was dissolved in 75 mL $CH_2Cl_2$ to obtain a homogenous solution A, into which 40 g 2,2'-bis(4-cyanatophenyl) propane (bisphenol A type cyanate eater) was slowly added with vigorous stirring, and the whole mixture was maintained at 150° C. for 40 min to get a prepolymer. The prepolymer was put into a vacuum for de-gassing at 145° C. for 30 min, and then put into a preheated mold and an oven for curing and postcuring using the procedure of 150° C./2 h+180° C./2 h+200° C./2 h+220° C./2 h+240° C./4 h. followed by cooling to room temperature naturally in the oven. A dielectric carbon nanotube/poly(ether imide)/cyanate eater composite was obtained.

EXAMPLE 11

1. Preparation of Carbon Nanotube/Poly(Ether Imide) Complex

The melting temperature of Haake torque chamber was set at 330° C. and the shearing rate was 60 r/min. 3.0 g multi-walled carbon nanotubes and 60 g poly(ether imide) were homogenously blended to form a blend, which was then put into the Haake torque chamber, and mixed for 25 min. After that, cooled to the room temperature, the carbon nanotube/poly(ether imide) complex was achieved.

2. Preparation of Dielectric Carbon Nanotube/Poly(Ether Imide)/Bismaleimide-Cyanate Eater Composite 10.0 g carbon nanotube/poly(ether imide) complexes was dissolved in 80 mL $CH_2Cl_2$ to obtain a homogenous solution A, into which 8 g 2,2'-bis(4-cyanatophenyl) propane (bisphenol A type cyanate eater) and 42 g 4, 4'-bismaleimido-diphenylmethane were slowly added with vigorous stirring, and the whole mixture was maintained at 150° C. for 40 min to get a prepolymer. The prepolymer was put into a vacuum for de-gassing at 145° C. for 30 min, and then put into a preheated mold and an oven for curing and postcuring using the procedure of 165° C./2 h+185° C./2 h+220° C./2 h+240° C./4 h. followed by cooling to room temperature naturally in the oven. A dielectric carbon nanotube/poly(ether imide)/bismaleimide-cyanate eater composite was obtained.

EXAMPLE 12

1. Preparation of Carbon Nanotube/Poly(Ether Imide) Complex

The melting temperature of Haake torque chamber was set at 340° C. and the shearing rate was 90 r/min. 4.2 g multi-walled carbon nanotubes and 60 g poly(ether imide) were homogenously blended to form a blend, which was then put into the Haake torque chamber, and mixed for 10 min. After that, cooled to the room temperature, the carbon nanotube/poly(ether imide) complex was achieved.

2. Preparation of Dielectric Carbon Nanotube/Poly(Ether Imide)/Epoxy Composite 10.0 g carbon nanotube/poly(ether imide) complexes was dissolved in 70 mL $CH_2Cl_2$ to obtain a homogenous solution A, into which 50 g diglycidyl ether of bisphenol A (Epikote 828 from Shell Co. USA) was slowly added with vigorous stirring, and the whole mixture was maintained at 60° C. for 30 min to get a blend. After that 2 g 2-cymene-4-ethylic imidazole was added with stirring and stayed at 60° C. for 10 min to form a homogeneous mixture. The mixture was put into a vacuum for de-gassing at 60° C. for 10 min, and then put into a mold and an oven for curing and postcuring using the procedure of 80° C./2 h+100° C./2 h+120° C./2 h+150° C./2 h+180° C./4 h. followed by cooling to room temperature naturally in the oven. A dielectric carbon nanotube/poly(ether imide)/epoxy composite was obtained.

EXAMPLE 13

1. Preparation of Carbon Nanotube/Poly(Ether Imide) Complex

The melting temperature of Haake torque chamber was set at 300° C. and the shearing rate was 60 r/min. 0.4 g multi-walled carbon nanotubes, 0.2 g single-walled carbon nanotubes and 60 g poly(ether imide) were homogenously blended to form a blend, which was then put into the Haake torque chamber, and mixed for 10 min. After that, cooled to the room temperature, the carbon nanotube/poly(ether imide) complex was achieved.

2. Preparation of Dielectric Carbon Nanotube/Poly(Ether Imide)/Epoxy Composite 8.0 g carbon nanotube/poly(ether imide) complexes was dissolved in 65 mL $CH_2Cl_2$ to obtain a homogenous solution A, into which 40 g diglycidyl ether of bisphenol A (Epikote 828 from Shell Co. USA) was slowly added with vigorous stirring, and the whole mixture was maintained at 60° C. for 40 min to get a blend. After that 2 g 2-cymene-4-ethylic imidazole was added with stirring and stayed at 60° C. for 10 min to form a homogeneous mixture. The mixture was put into a vacuum for de-gassing at 60° C. for 10 min, and then put into put into a mold and an oven for curing and postcuring using the procedure of 80° C./2 h+100° C./2 h+120° C./2 h+150° C./2 h+180° C./4 h. followed by cooling to room temperature naturally in the oven. A dielectric carbon nanotube/poly(ether imide)/epoxy composite was obtained.

EXAMPLE 14

1. Preparation of Carbon Nanotube/Poly(Ether Imide) Complex

The melting temperature of Haake torque chamber was set at 320° C. and the shearing rate was 60 r/min. 2.4 g single-walled carbon nanotubes and 60 g poly(ether imide) were homogenously blended to form a blend, which was then put into the Haake torque chamber, and mixed for 25 min. After that, cooled to the room temperature, the carbon nanotube/poly(ether imide) complex was achieved.

2. Preparation of Dielectric Carbon Nanotube/Poly(Ether Imide)/Epoxy Composite 9.0 g carbon nanotube/poly(ether imide) complexes was dissolved in 80 mL $CH_2Cl_2$ to obtain a homogenous solution A, into which 45 g diglycidyl ether of bisphenol A (Epikote 828 from Shell Co. USA) was slowly added with vigorous stirring, and the whole mixture was maintained at 60° C. for 40 min to get a blend. After that 2 g 2-cymene-4-ethylic imidazole was added with stirring and stayed at 60° C. for 10 min to form a homogeneous mixture. The mixture was put into a vacuum for de-gassing at 60° C. for 10 min, and then put into put into a mold and an oven for curing and postcuring using the procedure of 80° C./2 h+100° C./2 h+120° C./2 h+150° C./2 h+180° C./4 h. followed by cooling to room temperature naturally in the oven. A dielectric carbon nanotube/poly(ether imide)/epoxy composite was obtained.

What is claimed is:

1. A preparation method of a carbon nanotube/polyetherimide/thermosetting resin dielectric composite comprising following steps:
   (1) mixing 100 parts by weight of polyetherimide and 1-7 parts by weight of carbon nanotube uniformly and adding into an Haake torque melt cavity, mixing in a Banbury mixer for 10-30 min under the temperature of 300-340° C. with the rotating speed of 50-150 r/min, to obtain a carbon nanotubes/polyetherimide composite;
   (2) in a mass ratio, dissolving 20 parts of carbon nanotube/polyetherimide composite in 120-150 parts of methylene chloride, and mixing the resulting solution with 100 parts of molten thermosetting resin, heat preserving and stirring for 30-50 min, after curing to obtain a carbon nanotube/polyetherimide/thermosetting resin dielectric composite.

2. The preparation method of a carbon nanotube/polyetherimide/thermosetting resin dielectric composite according to claim 1, wherein said carbon nanotube is one of single-walled carbon nanotube without surface treatment, multi-walled carbon nanotube without surface treatment, or their combination.

3. The preparation method of a carbon nanotube/polyetherimide/thermosetting resin dielectric composite according to claim 1, wherein said thermosetting resin is a self-curing thermosetting resin, or a resin system composing of a resin that cannot be thermally cured by itself and curing agents.

4. The preparation method of a carbon nanotube/polyetherimide/thermosetting resin dielectric composite according to claim 3, wherein said self-curing thermosetting resin is bismaleimide, cyanate ester, or their combination.

5. The preparation method of a carbon nanotube/polyetherimide/thermosetting resin dielectric composite according to claim 3, wherein said resin that cannot be thermally cured by itself is epoxy resin.

6. A carbon nanotube/polyetherimide/thermosetting resin dielectric composite obtained by the preparation method according to claim 1.

* * * * *